United States Patent [19]

Pratt

[11] Patent Number: 4,961,472

[45] Date of Patent: Oct. 9, 1990

[54] POSTAL SCALE AND THICKNESS GAUGE

[76] Inventor: Otis L. Pratt, 4230 Windsor Rd. South, Theodore, Ala. 36582

[21] Appl. No.: 377,126

[22] Filed: Jul. 10, 1989

[51] Int. Cl.$^5$ .......................... G01G 1/02; G01G 1/18
[52] U.S. Cl. ...................................... 177/216; 177/246
[58] Field of Search ........................ 177/246, 250, 216

[56] References Cited

FOREIGN PATENT DOCUMENTS 0586896 4/1977 Switzerland .......................... 177/246
0001131 of 1900 United Kingdom ................. 177/246

Primary Examiner—George H. Miller, Jr.
Attorney, Agent, or Firm—Phillips & Beumer

[57] ABSTRACT

A portable postal scale for determining whether the weight of a letter exceeds the maximum for a given amount of postage, for example, one ounce. The scale has a beam in the form of an elongated block with two thicknesses. The flat bottom surface of the thicker portion terminates in a transverse edge that serves as a fulcrum. The thinner end has a clamp for holding a letter, and that end is intended for extension over the edge of a table or desk so that downward movement of the letter is unobstructed. If the letter exceeds the maximum, the thinner end will pivot downward around the fulcrum. The thinner end has a flat bottom surface parallel to the bottom surface of the thicker end and spaced apart a distance corresponding to the maximum letter thickness for a given amount of postage, for example, one-fourth inch. Whether the letter meets this criteria can be determined by sliding it through the opening formed by the bottom surface of the thinner end and flat surface upon which the bottom surface of the thicker end is resting. Longitudinally movable counterweights for determining additional increments of weight are provided in other embodiments. The beam presents substantial surface area usable for display of advertising material, making the device attractive as an advertising novelty item.

8 Claims, 3 Drawing Sheets

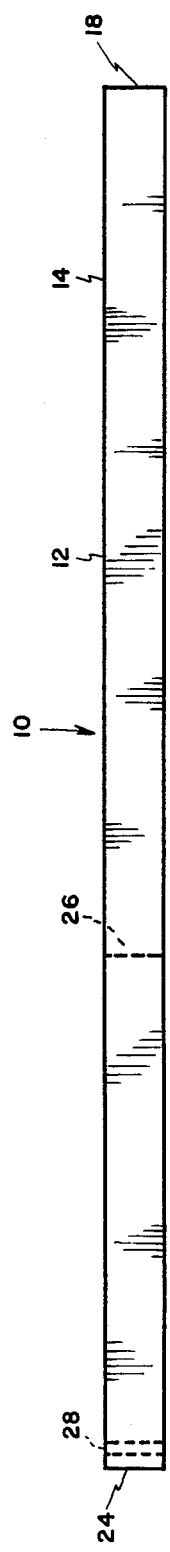
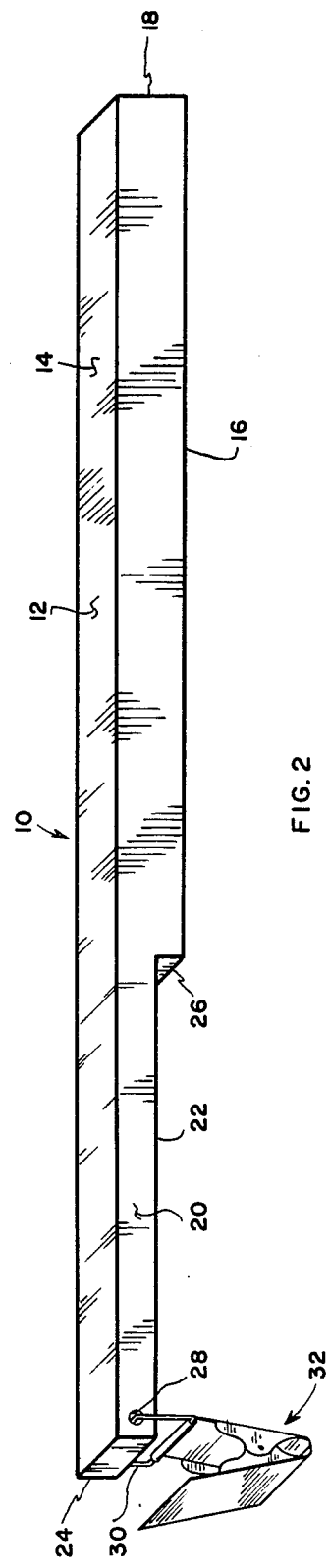

POSTAL SCALE AND THICKNESS GAUGE

FIELD OF THE INVENTION

This invention relates to portable postal scales for determining the correct amount of postage required for letters.

BACKGROUND OF THE INVENTION

Lightweight portable postal scales serve a useful function for postal patrons who do not have convenient access to more complicated platform scales available at post offices and elsewhere. In particular, a portable postal scale enables the user to determine whether the weight of a letter exceeds a maximum value such as one ounce.

Various types of portable postal scales are described in prior art patents. U.S. Pat. No. 2,284,526 shows a scale having a beam formed of a thin strip of metal with a thicker counterweight arm secured to one end of the beam. A clip for clamping a letter is disposed at the other end of the beam, and a downward-projecting transverse fulcrum is provided at an intermediate location on the beam by the downwardly bent end of the counterweight arm. In operation the scale is placed on a flat surface with the clamping end extending over its edge so that the weight of the letter may cause the beam to pivot downward if a predetermined weight is exceeded. Another type of scale using a balance beam and a downward-projecting fulcrum is disclosed in U.S. Pat. No. 2,949,287. This scale requires placement of a letter flatwise on an arm of the beam with its center of gravity at a predetermined distance from the fulcrum. U.S. Pat. No. 3,820,322 also discloses a device having a flat beam and a downward-projecting transverse fulcrum, the letter to be weighed being placed with its center of gravity on the longitudinal axis of the beam. Other approaches are shown by U.S. Pat. Nos. 3,224,516 and 4,053,024, which are respectively concerned with use of a magnetic fulcrum pin insertable in transverse grooves and with a flexible planar strip of material bent back on itself to provide a spring effect.

The prior art scales discussed above present various limitations and disadvantages. The beam devices that use a downward-projecting fulcrum are not amenable to performance of an additional function, that is, measurement of the thickness of a letter by attempting to slide it under the clamp holding end of the beam. A downward-projecting fulcrum rendered such measurement inaccurate. Devices that require placement of a letter with its center of gravity at a predetermined location introduce inaccuracy to the weighing function because of variances in the center of gravity from one letter to another with equal outside dimensions. In addition, the prior art devices employ a relatively flat beam with little or no space on the beam sides for printed material other than necessary for their weighing function. A thicker beam in a form such as a generally rectangular block would provide space on its sides for advertising material or the like and enable marketing of the scale as an advertising novelty device.

SUMMARY OF THE INVENTION

The present invention is directed to a portable postal scale having a beam in the form of an elongated block and including two flat surfaces making up the bottom of the beam and defining a thicker portion and a thinner portion, with a transverse edge of the thicker portion providing a fulcrum for downward pivoting motion of the thinner end when the weight of a letter attached to that end exceeds a predetermined value. A clamping means is provided at the tinner end for securing a letter or other object to be weighed. The beam is adapted to be placed on a flat level surface of a table or the like with the thinner end extending past the edge of the surface so that a letter clamped thereto is free to move downward and cause that end of the beam to pivot downward. Preferably, the beam may be constructed with the edge that provides the fulcrum being located such that a weight that exceeds one ounce causes the thinner end to tip downward. Movable counterweight means may also be provided for location at longitudinal points spaced apart from the fulcrum and corresponding to smaller or larger increments of weight required to tip the beam. The flat surface at the bottom of the thinner end may be adapted for performance of a thickness gauge measure function by sizing the difference in thickness between the thicker and thinner portions to provide a gap between the bottom of the thinner portion and the flat surface upon which the beam is placed to correspond to a predetermined maximum thickness such as one-fourth inch, which is a factor in determining correct postage for letters. By use of a block having substantial thickness for the beam, sufficient space is made available for placement of advertising material on its sides as well as on the top, thus making the scale attractive as an advertising novelty item having a useful function.

It is, therefore, an object of this invention to provide a portable scale having a beam that is pivotal around a transverse edge coplanar with a thicker flat bottom portion of the beam.

Another object is to provide a postal scale having a balance beam adapted to pivot downward at one end upon having a letter or other item that exceeds a predetermined weight secured to that end.

Another object is to provide a portable postal scale that includes means for determining whether the thickness of a letter exceeds a predetermined amount.

Another object is to provide a portable beam-type postal scale with sufficient area for use as an advertising novelty item.

BRIEF DESCRIPTION OF THE DRAWINGS

FIG. 1 is a top planar view of a balance beam for use in the invention.

FIG. 2 is a perspective view of the beam of FIG. 1 with clamping means in place.

DESCRIPTION OF THE PREFERRED EMBODIMENT

Figure 3:
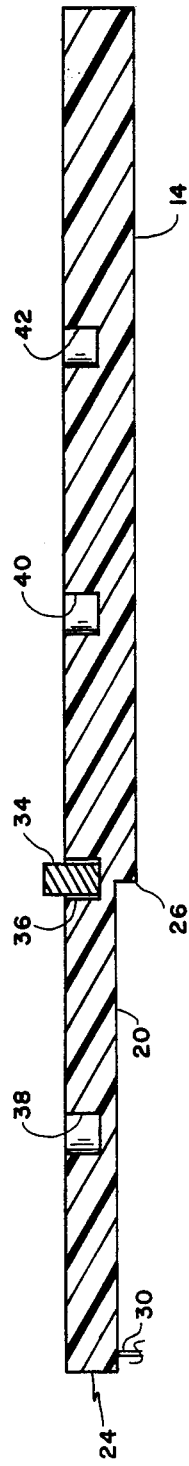
FIG. 3 is a sectional view taken along line 3—3 of FIG. 4.

Referring to FIGS. 1 and 2 of the drawings, there is shown a portable postal scale 10 having an elongated generally rectangular beam 12. The beam has a thicker portion 14 with a flat bottom surface 16 extending the length of this portion and terminating in end 18 and transverse edge 26. Thinner portion 20 extends from edge 26 to the opposite end 24 and has a flat bottom surface 22 parallel to surface 16. Thinner portion 20 has a thickness that is less than the thickness of thicker portion 14 by an increment that corresponds to a predetermined distance such as one-quarter inch so that one may readily determine whether a letter exceeds such distance by attempting to slide the letter under the thinner portion when the beam is placed on a flat surface.

A transversely extending aperture 28 is disposed in thinner portion 20 parallel to and slightly spaced apart from end 24, the aperture enabling placement therein of a clamp support 30 for securing a clamp 32 for removably grasping the letter to be weighed. The beam is sized so that a predetermined amount of weight such as weight in excess of one ounce, in addition to the weight of the clamp and clamp support, when applied downward at aperture 28 will cause end 24 to tip downward. Adjustments to provide this result may be made by varying the width and/or length of the beam or the location of the transverse edge relative to ends 18 and 24. Operation of the scale as described above requires that the beam be placed with surface 16 on a flat surface having an accessible edge as may be provided by a table, desk, or the like and that end 24 extend past that surface edge so that the clamp and attached letter or other item are free to move downward without obstruction.

Figure 4:
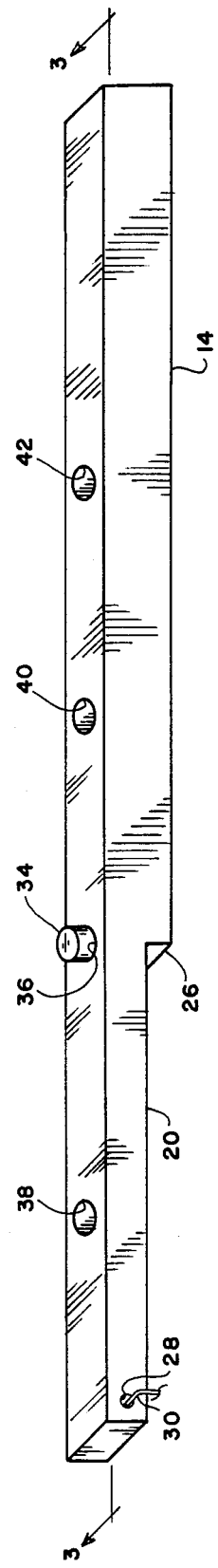
FIG. 4 is a perspective view of an embodiment of the invention having a movable counterweight for placement at various longitudinal positions.

FIGS. 3 and 4 show an embodiment wherein a movable counterweight 34 is provided for placement in any one of longitudinally spaced apart mating apertures 36, 38, 40, or 42. This enables the determination of whether a letter or other item attached to clamp 32 exceeds a predetermined amount larger or smaller than the single amount as would be enabled by the embodiment shown in FIGS. 1 and 2. Where only that amount is to be determined, counterweight 34 would be placed in aperture 36 located directly above edge fulcrum 26. For greater amounts, counterweight 34 would be placed in aperture 40 or 42 longitudinally spaced apart from aperture 36 in thicker end 14, and for a lesser amount, it would be placed in aperture 38 in thinner portion 20. Counterweight 34 projects above the top surface of beam 12 to enable grasping it for movement. The apertures may be located to correspond to the desired combinations of weights to be determined. For example, where the fulcrum position is for one ounce, aperture 38 could be placed to provide for one-half ounce and apertures 40 and 42 to provide for one and one-half and two ounces, respectively.

Figure 5:
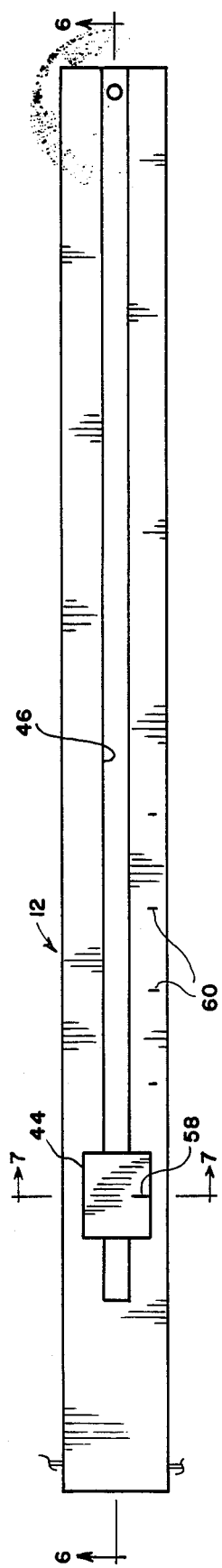
FIG. 5 is a top planar view of an embodiment which includes a slidable weight in the beam.
Figure 6:
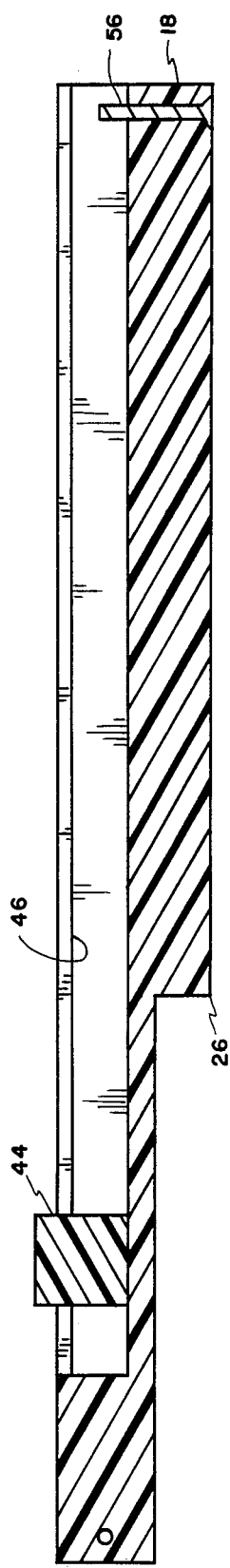
FIG. 6 is a sectional view taken along line 6—6 of FIG. 5.
Figure 7:
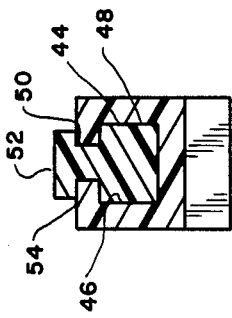
FIG. 7 is a sectional view taken along line 7—7 of FIG. 5.

FIGS. 5, 6, and 7 show an embodiment where a slidable counterweight 44 is mounted in an internal track 46 extending along the length of beam 12. The counterweight has a base 48 with a generally square cross section, a neck 50 of reduced width, and a knob 52 at the top for grasping. Projecting portions 54 of the track fit within the neck and retain the counterweight within the internal track while maintaining it in aligned position. A stop in the form of a screw 56 adjacent end 18 is provided to keep the counterweight from sliding out the end of the track. This embodiment enables the weight of letters or other items to be determined for a range of values by sliding the counterweight to any one of a plurality of desired locations. When counterweight 44 is placed directly over fulcrum 26, the measured weight would be the same as in the absence of counterweight 44. At positions toward the thinner end, the measured weight would be smaller, and at positions toward the thicker end, it would be larger. An indicator line 58 on counterweight 44 is disposed for alignment with indicator lines 60 on the top of beam 12, the lines 60 corresponding to predetermined weights in desired increments. The slidable counterweight 44 should be sized to provide a frictional fit with sides of the track so as to maintain its position once moved to a desired location. A spring detent that engages depressions in the track (not shown) may also be used.

The beam in the embodiment described above has a substantial thickness so that the area of its sides provides enough space for display of advertising material. This makes the device attractive as an advertising novelty item that performs a useful function. In addition, scales embodying the invention may be produced inexpensively from materials such as plastic, further facilitating novelty item applications. As described above, the beam is an elongated block of rectangular cross sections at both its thicker and thinner ends. However, the shapes of the cross sections may be varied, provided that the bottom surface of the thicker end is kept flat and parallel to the bottom surface of the thinner end and the beam is symmetrical around a line extending through its length.

Although the invention is described above in terms of specific embodiments, it is not to be understood as limited thereto but is limited only as indicated by the following claims.

I claim:

1. A postal scale device for determining whether the weight of a letter exceeds a predetermined amount comprising:

an elongated block having along its length a thicker portion adjacent one end and a thinner portion adjacent the other end, each of said portions including a flat bottom surface defining a plane parallel to the surface of the other portion;

said bottom surface of the thicker portion at its juncture with the thinner portion terminating in a transverse fulcrum edge perpendicular to the length of the beam;

letter clamping means fixedly secured to the thinner portion of the beam at or near the outer end thereof; and the relative size and weights of the thicker and thinner regions being selected to provide for pivotal downward movement of said thinner end around said edge fulcrum when the beam is placed on a flat level surface with the thinner end extending past an edge thereof and when the weight of the letter clamped thereto exceeds a predetermined amount.

2. A postal scale as defined in claim 1 wherein the bottom surface of said thinner portion is spaced apart from the bottom surface of the thicker portion a predetermined distance corresponding to the maximum allowable thickness of a letter for a given amount of postage, whereby whether or not said allowable thickness is exceeded may be determined by attempting to slide the letter between the bottom surface of said thinner portion and said flat level surface.

3. A postal scale as defined in claim 2 wherein sides of said block provide sufficient space for displaying of advertising material.

4. A postal scale as defined in claim 2 wherein said block has a generally rectangular cross section.

5. A postal scale as defined in claim 4 including a plurality of recesses in the top surface of said block and a counterweight adapted to be removably placed in one of said recesses, said recesses being located at positions along the beam suitable for determining the weight of a letter in predetermined variable increments.

6. A postal scale as defined in claim 4 including a longitudinally extending track defined in the top surface of the block and a counterweight mounted in said track for slidable movement therein whereby the slidable counterweight may be moved to a plurality of locations corresponding to various predetermined weights.

7. A postal scale as defined in claim 6 wherein said counterweight has recessed portions on each side thereof, providing a neck, and said track has inwardly projecting portions adapted to be received in said recessed portions.

8. A postal scale as defined in claim 6 including indicator means disposed on said counterweight and on the top surface of said block for enabling alignment at predetermined positions.

* * * * *